United States Patent [19]

Tetsuda

[11] Patent Number: 5,146,322
[45] Date of Patent: Sep. 8, 1992

[54] PROJECTION TELEVISION APPARATUS FOR REDUCING RED-EMPHASIZED PERIPHERAL SCREEN PORTIONS

[75] Inventor: Hiroshi Tetsuda, Nagaokakyo, Japan

[73] Assignee: Mitsubishi Denki Kabushiki Kaisha, Tokyo, Japan

[21] Appl. No.: 592,458

[22] Filed: Oct. 5, 1990

[30] Foreign Application Priority Data

Oct. 11, 1989 [JP] Japan .................. 1-264163

[51] Int. Cl.$^5$ ............................................. H04N 9/31
[52] U.S. Cl. .................................... 358/60; 358/237; 358/64; 313/474
[58] Field of Search ................ 358/60, 64, 65, 237, 358/253; 313/474, 116; 350/438, 166, 167, 432, 449, 450; 359/580–582, 585–588, 589

[56] References Cited

U.S. PATENT DOCUMENTS

| | | | |
|---|---|---|---|
| 4,245,242 | 1/1981 | Trcka | 358/64 |
| 4,454,535 | 6/1984 | Machida | 358/60 |
| 4,626,740 | 12/1986 | Fitzpatrick | 313/112 |
| 4,634,926 | 1/1987 | Vriens et al. | 313/474 |
| 4,642,695 | 2/1987 | Iwasaki | 358/64 |
| 4,647,812 | 3/1987 | Vriens et al. | 358/253 |
| 4,683,398 | 7/1987 | Vriens et al. | 313/474 |
| 4,766,498 | 8/1988 | Spruit | 358/237 |
| 4,804,884 | 2/1989 | Vriens et al. | 313/474 |
| 4,807,014 | 2/1989 | Van Gorkum et al. | 358/60 |
| 4,882,617 | 11/1989 | Vriens | 358/60 |
| 4,933,599 | 6/1990 | Fukuda | 358/237 |
| 4,937,661 | 6/1990 | Van der Voort | 358/64 |

*Primary Examiner*—James J. Groody
*Assistant Examiner*—Glenton B. Burgess

[57] ABSTRACT

A projection television apparatus is composed of a combination of cathode ray tubes for the three primary colors, red, green and blue. The green and blue cathode ray tubes have a multilayered interference filter disposed on the inner surface thereof and display light on a screen, the intensity of which is varied by the multilayered interference filter, passing through a series of projection lenses positioned in front of the cathode ray tubes. The red cathode ray tube has no multilayered interference filter and produces light having a distribution of luminous intensity nearly equal to that of the green and blue lights. This is achieved by displaying light, the luminous intensity of which is not varied, passing through a series of projection lenses with a diaphragm.

7 Claims, 4 Drawing Sheets

PROJECTION TELEVISION APPARATUS FOR REDUCING RED-EMPHASIZED PERIPHERAL SCREEN PORTIONS

BACKGROUND OF THE INVENTION

1. Field of the Invention

This invention relates to a projection television apparatus including cathode ray tubes of three primary colors; red, green, blue, on the inner surface of which a multilayered interference filter is disposed.

2. Description of the Related Art

Because of a high vacuum within the envelope of the cathode ray tube, the larger its size becomes, the more influences due to a stress of an atmospheric pressure or a thermal stress caused in the heating/cooling steps when a cathode ray tube is manufactured increase thereby making it difficult to design the cathode ray tube. As a result, instead of the cathode ray tube, a projection television apparatus has been used as display apparatus for use in a television having a size of 45 inches or more.

As the projection type television apparatus, there are two basic types of the projection television. One is a projection television having a cathode ray tube which incorporates a refecting mirror and a lens for aberration correction use. The other is a projection television provided with a lens refraction at its exterior. Since advances have been made in the field of projection lens technique since and it has become possible to manufacture a projection lens having a large aperture and capable of obtaining a sufficient brightness at a low cost, the projection television of a refraction type is now extensively employed.

FIG. 3 of the accompanying drawings is a schematic plan view illustrating a structure of a conventional lens unit and a fragmentary enlarged plan view of a display window disposed inside of a cathode ray tube. At the inside of a cathode ray tube 1, there are provided a face plate pane 4, a fluorescent material layer 6 disposed on the innermost of the cathode ray tube 6 and a multilayered interference filter 5 inserted between the display face plate pane and the fluorescent material layer. When electron beams are incident on the fluorescent material layer 6, light having a predetermined wavelength is emitted from the fluorescent material layer 6 and radiated in a forward direstion out of the cathode ray tube passing through the multilayered interference filter 5 and the display face plate pane 4.

Further, a series of projection lenses 2 having the incident pupil at the center thereof are positioned in front of the cathode ray tube 1, and an image is produced on a screen (not shown) by reflecting light emitted from the cathode ray tube 1.

Still, the multilayered interference filter 5, disposed on the inner surface of the cathode ray tube 1, is composed of alternately superimposed high and low refractive index materials, and the distribution of luminous intensity emitted from the fluorescent material layer 6 is varied by interference of a beam of light. In the fragmentary enlarged plan view, there are illustrated the distribution of luminous intensity 7 produced by the cathode ray tube having the multilayered interference filter 5 and the distribution of luminous intensity 8 produced by the cathode ray tube having no multilayered interference filter 5. The lesser becomes an angle $\theta$ which a light-emitting phosphor dot of the fluorescent material layer 6 forms with respect to the incident pupil 3 positioned at the center of a display window 12. In other words, the closer the light-emitting phosphor dot is located to the center of the display window 12, the more the luminous intensity increases. In addition, it should be understood that the more the angel $\theta$ increases, namely, the farther the light-emitting phosphor dot is located from the center of the display window 12, the smaller the luminous intensity of the cathode ray tube having the multilayered interference filter 5 becomes, compared to that of the cathode ray tube having no multilayered interference filter 5.

In a structure, a conventional projection television apparatus comprises a combination of cathode ray tubes for three primary colors, i.e., red, green, blue. The green and blue cathode ray tubes have a multilayered interference filter 5 disposed on the inner surface of the cathode ray tube 1 in order to improve the brightness, whereas the red cathode ray tube is not equipped with the multilayered interference filter because it has an allowance for further increase of beam currents necessary for enhancing the brightness. This thereby reduces the cost of the apparatus.

However, with this conventional structure in which only the red cathode ray tube has no multilayered interference filter, there is a disadvantage in that the display color becomes red-emphasized at the peripheral portion of a screen due to discrepancies of the luminous intensity as shown in the fragmentary enlarged plan view of FIG. 3.

SUMMARY OF THE INVENTION

Accordingly, this invention is made to solve the above-mentioned drawbacks of the prior art. An object of the present invention is to provide a projection television apparatus capable of producing uniform color almost on the entire screen without increasing the production cost.

To this end, a projection television apparatus, in accordance with the present invention, comprises a red cathode ray tube having no multilayered interference filter and a series of projection lenses with a diaphragm for both refracting light emitted from the fluorescent material layer disposed in front of the red cathode ray tube and decreasing the luminous intensity at the peripheral portion of the screen relative to that at the screen center.

The series of projection lenses with the diaphragm include a series of projection lenses capable of reflecting light emitted from the fluorescent material layer of the red cathode ray tube and the ring-shaped diaphragm arranged to form a concentric circle to the central axis of the series of projection lenses.

In practice, the series of lenses with the diaphragm disposed in front of the red cathode ray tube decreases the luminous intensity around the peripheral portion of the screen when light emitted from the red cathode ray tube is displayed on the screen. This thereby obtains a luminous intensity distribution nearly equal to that of light radiated from the green and blue cathode ray tubes having the multilayered interference filter. Accordingly, the red-emphasized display color is eliminated from the periphery of the screen, and it becomes possible to obtain an image displayed with uniform color.

The foregoing and other objects, features and advantages of the invention will be apparent from the following more particular description of preferred embodiments of the invention, as illustrated in the accompanying drawings.

BRIEF DESCRIPTION OF THE INVENTION

DESCRIPTION OF THE PREFERRED EMBODIMENT

A preferred embodiment will now be explained with reference to the accompanying drawings hereinbelow.

Figure 1:
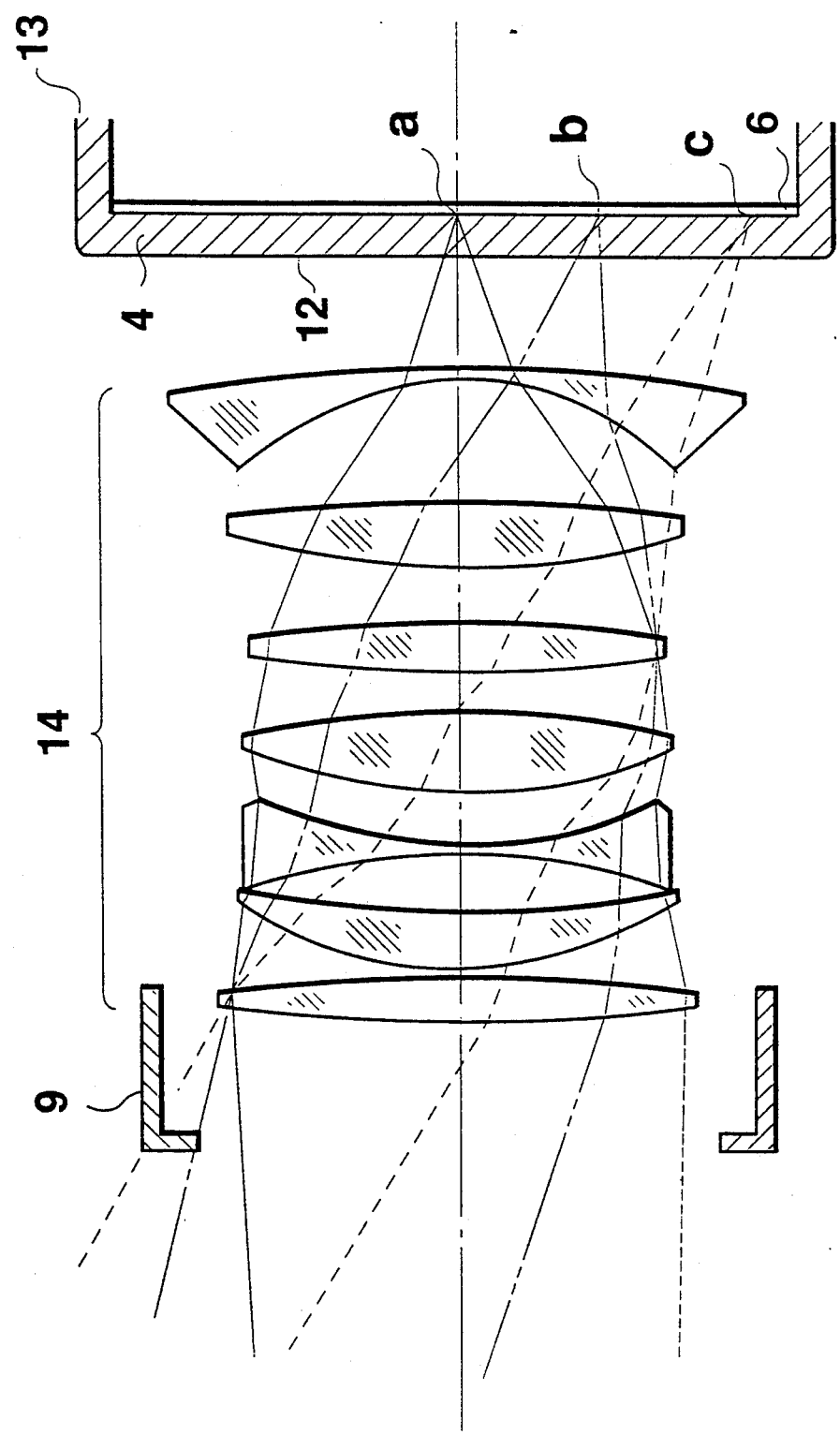
FIG. 1 is a schematic plan view illustrating a structure of a series of projection lenses with a diaphragm of a projection television in accordance with one preferred embodiment of the present invention.

FIG. 1 is a schematic view illustrating a structure of a series of projection lenses with a diaphragm of a projection television apparatus in accordance with one embodiment of the present invention.

At the inside of a red cathode ray tube 13, there was provided a display face plate pane 4 and a fluorescent material layer 6 disposed on the innermost side of the cathode ray tube. When electron beams are incident on the fluorescent material layer 6, a red light is radiated from the fluorescent material layer 6 and emitted in a forwardly direction out of the cathode ray tube passing through the display face plate pane 4.

In front of the red cathode ray tube 13, there is provided a series of projection lenses with a diaphragm (9) having the incident pupil 3 almost at the center thereof. An image is produced on a not-illustrated screen (not shown) by reflecting light emitted from the red cathode ray tube 13.

Figure 4:
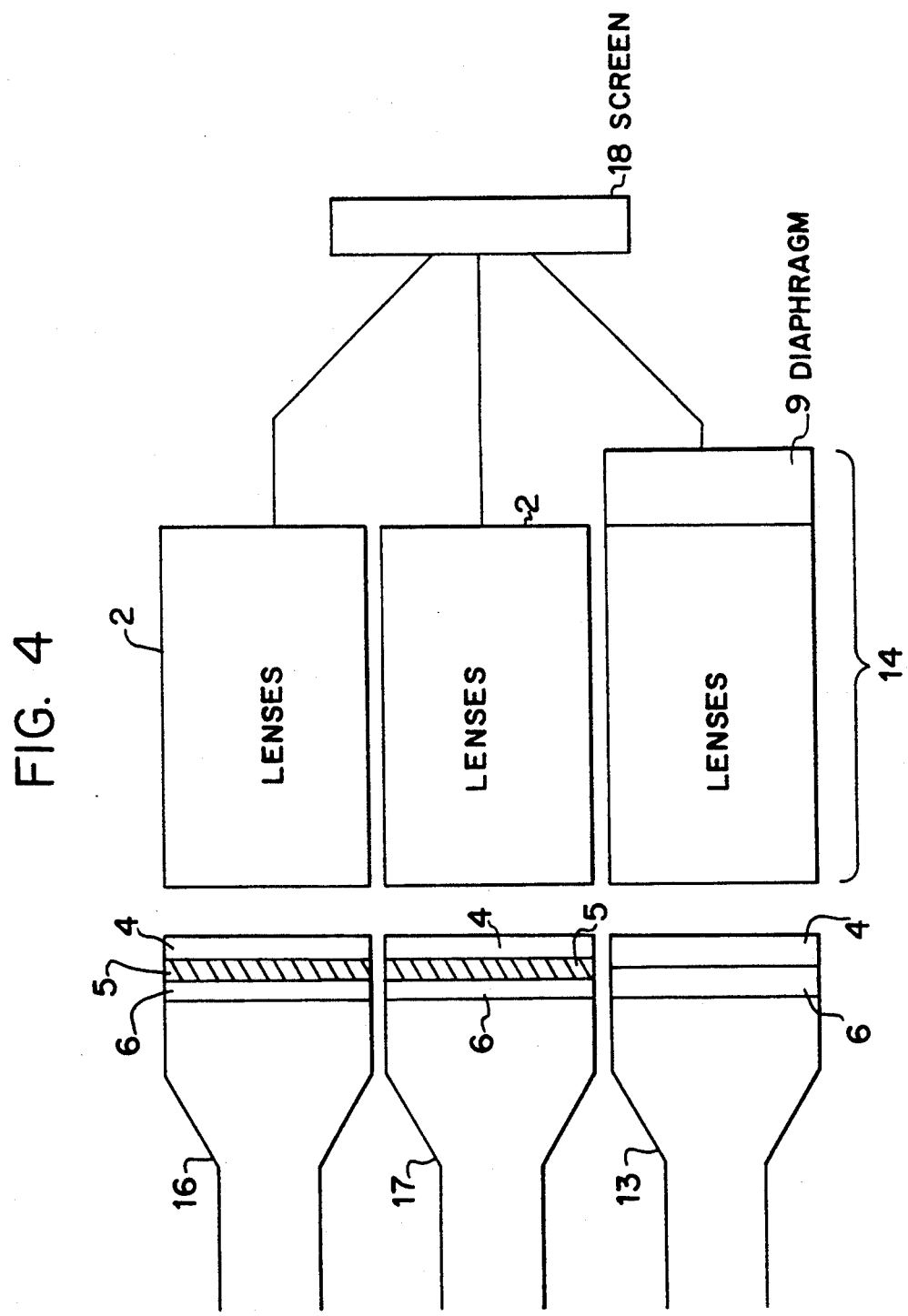
FIG. 4 illustrates the red, green, and blue CRT's and projection lens series of one embodiment of the present application.

Further, FIG. 4 shows the red cathode ray tube (CRT) 13, without a multilayered interference filter, in combination with the series of lenses 14 including diaphram 9. Further, FIG. 4 illustrates the blue CRT 16 and the green CRT 17, both including a fluorescent material layer 6, a display face-plate pne 4, and a multilayered interference filter 5. Both the blue and green CRT's 16 and 17 are illustrated in conjunction with a projection lens series 2. Light generated from the red, green and blue CRTs is then shown to be projected through the series of lenses onto screen 18.

Futhermore, in conjunction with the red CRT there is provided a ring-shaped diaphragm formed in the concentric circle with respect to the central axis of the lenses 14 at the tip end of the series of projection lenses with the diaphragm (9) decreasing the luminous intensity of the red light emitted from the fluorescent material layer 6.

More specifically, when attention is given to the three points "a", "b", "c" on a display window 12, a red light emitted from the point "a", located close to the center of the display window 12 is displayed on the screen without being affected by any influence of the diaphragem 9. Further, the lyuminous intensity of the red light emitted from the points "b", "c" locating at the periphery of the display window 12 is impaired by the diaphragm 9, thereby projecting the red light with the luminous intensity relatively impaired at its periphery.

Figure 2:
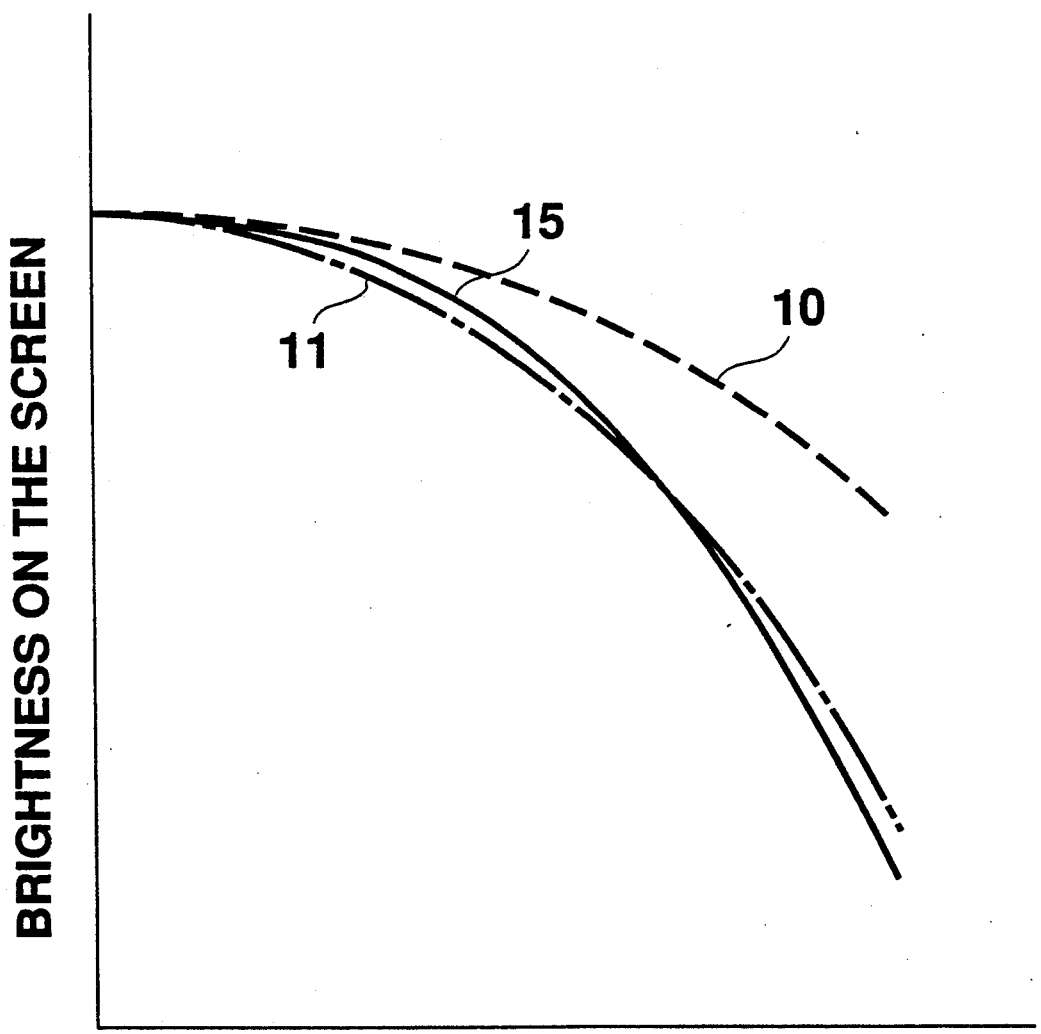
FIG. 2 is an explanatory graph illustrating a distribution of luminous intensity on a screen in connection with FIG. 1.
Figure 3A:
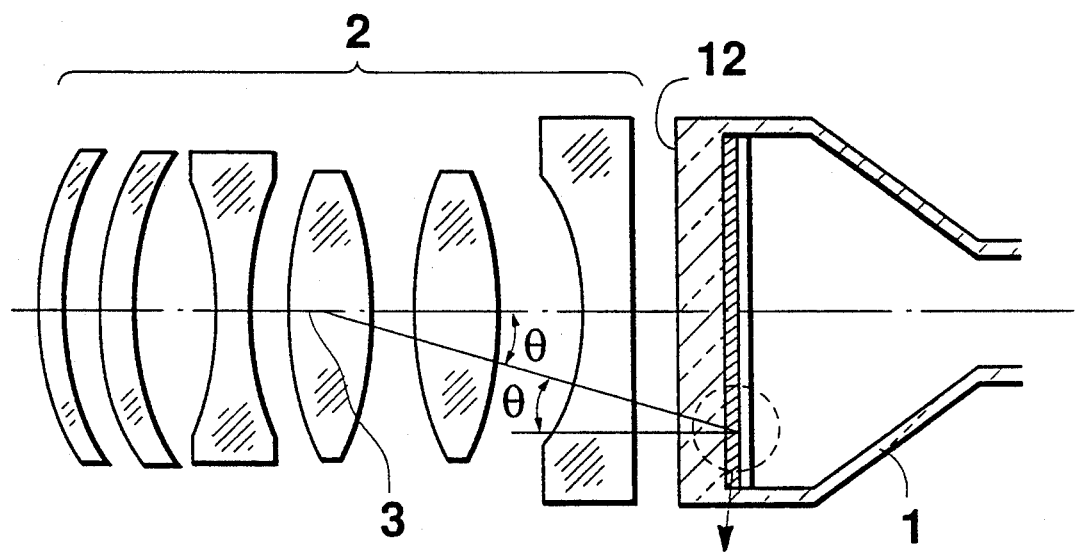
FIG. 3 is a schematic plan view illustrating a structure of a conventional projection television.
Figure 3B:
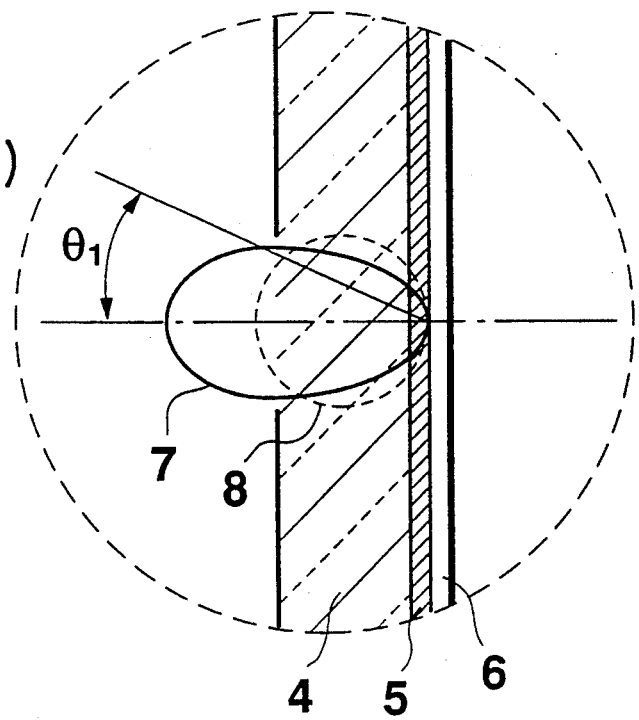

FIG. 2 shows a luminous intensity distribution 10 of the red light displayed on the screen passing through the cathode ray tube having no multilayered interference filter 5, a luminous intensity 11 of the red light projected through the cathode ray tube having a multilayered interference filter 5 and the series of projection lenses 2, and a luminous intensity 15 of the red light displayed on the screen passing through the series of lenses 14 with the diaphragm in accordance with the embodiment. In accordance with this embodiment, the luminous intensity of the red light becomes almost the same as the luminous intensity 11 of light emitted from the blue and green cathode ray tubes comprising the multilayered interference filter 5.

Although the projection television apparatus in accordance with this invention is provided with the ring-shaped diaphragm 9 disposed at the tip end of the series of projection lenses with diaphragm (14), as an alternative, this ring-shaped diaphragm 9 may be positioned at the center of the series of lenses.

Therefore, in accordance with the present invention, it becomes possible to produce an image uniform in color on the entire screen by the diaphragm provided in the series of lenses, instead of an expensive multilayered interference filter disposed at the inside of the red cathode ray tube.

What is claimed is:

1. A projection television apparatus including red, green and blue cathode ray tubes for displaying light on a screen, emitted from each of the red, green and blue cathode ray tubes, further comprising;
   (a) a multilayered interference filter, inserted between a display face plate pane and a fluorescent material layer of said blue and green cathode ray tubes, for varying a luminous intensity of light emitted from said fluoresecent material layer;
   (b) a series of projection lenses, located in front of said blue and green cathode ray tubes, for projecting onto a screen, the luminous intensity which is varied by said multilayered interference filter refracting said light; and
   (c) a series of projection lenses, including a diaphragm, disposed in front of said red cathode ray tube, for refracting light from a fluorescent material layer of said red cathode ray tube and for decreasing luminous intensity at peripheral portions relatives to a center of said screen, thereby projecting an image onto said screen without need for a multilayered interference filter for the red cathode ray tube.

2. A projection television apparatus according to claim 1, wherein said series of projection lenses including said diaphragm is composed of a series of projection lenses for reflecting light emitted from said fluorescent material layer of said red cathode ray tube with a ring-shaped diaphragm arranged in a concentric circle to a center axis of said projection lenses.

3. The projection television apparatus of claim 2, wherein the ring-shaped diaphragm is located at an end, of the series of projection lenses, furthest from said red cathode ray tube.

4. The projection television apparatus of claim 1, wherein the diaphragm is located at an end, of the series of projection lenses, furthest from said red cathode ray tube.

5. A device, for use in a projection television including red, green and blue cathode ray tubes, with a series of projection lenses being located between each of the blue and green cathode ray tubes and a display screen, each including a multilayered interference filter, for projecting light from the blue and green cathode ray tubes onto a screen, with luminous intensity of light emitted from the blue and green cathode ray tubes being varied by the multilayer interference filter refracting the emitted light, the device comprising:

a series of projection lenses, including a diaphram, disposed between said red cathode ray tube and the screen, for refracting light emitted from said red cathode ray tube and for decreasing luminous intensity of the refracted light at peripheral portions relative to a center of the screen, thereby projecting an image onto the screen without need for a multilayered interference filter for the red cathode ray tube.

6. The device of claim 5, wherein the diaphragm is ring-shaped.

7. The device of claim 5, wherein the diaphragm is located at an end, of the series of projection lenses, furthest from said red cathode ray tube.

* * * * *